United States Patent [19]

Streng

[11] Patent Number: 4,729,353

[45] Date of Patent: Mar. 8, 1988

[54] FUEL CONTAINER SUPPORT SYSTEM FOR A COMBUSTION ENGINE

[75] Inventor: Roger H. Streng, St. Louis, Mo.

[73] Assignee: Engineered Air Systems, Inc., St. Louis, Mo.

[21] Appl. No.: 947,279

[22] Filed: Dec. 29, 1986

[51] Int. Cl.[4] ............................................. F02F 7/00
[52] U.S. Cl. ........................... 123/195 A; 123/195 C; 123/2; 290/1 A
[58] Field of Search ................. 123/2, 195 A, 195 C, 123/198 E, DIG. 1, DIG. 3, DIG. 6; 290/1 A

[56] References Cited

U.S. PATENT DOCUMENTS

| | | | |
|---|---|---|---|
| 1,751,625 | 3/1930 | Fisher | 123/DIG. 1 X |
| 2,274,644 | 3/1942 | Arden | 123/DIG. 3 X |
| 3,170,005 | 2/1965 | Phillips | 123/DIG. 3 X |
| 4,117,342 | 9/1978 | Melley, Jr. | 290/1 A |
| 4,226,214 | 10/1980 | Palazzetti | 123/2 |
| 4,503,812 | 3/1985 | Eberhardt | 123/2 |

*Primary Examiner*—Albert W. Davis, Jr.
*Assistant Examiner*—Richard R. Cole
*Attorney, Agent, or Firm*—Ralph B. Brick

[57] ABSTRACT

An improved fuel container support system for a combustion engine including an engine support frame having a moveable fuel container support shelf mounted thereon, the shelf being structured to move from a non-operating to an operational position to hold a fuel container at an angle to the horizontal for efficient fuel flow operation during engine running with the container positioned away from the engine during such running.

7 Claims, 2 Drawing Figures

FUEL CONTAINER SUPPORT SYSTEM FOR A COMBUSTION ENGINE

BACKGROUND OF THE INVENTION

The present invention relates to combustion engines and more particularly to an improved fuel container support system for a combustion engine.

Small liquid fuel burning combustion engines utilized in both military and commercial situations for furnishing power to various units such as (but not limited to) portable heaters, portable air conditioners, portable kitchens and portable pumps, have required usage of portable fuel containers to store liquid fuels such as gasoline or diesel oil which serve to fuel the combustion engines. In the past, these containers often have been stored with the same portable structure which serves to house the combustion engine or, if stored separately, have fed fuel to the engine from a position immediately above the engine to utilize gravity flow. The present invention recognizes that these past practices have presented safety hazards, with small quantities of fuel from the container often spilling over on hot combustion engine parts enhancing the risks of unconfined and uncontrollable fires. Recognizing these past safety hazards and, at the same time, recognizing the need for supporting the fuel containers in a preselected position for efficient fuel feeding during combustion engine operations, the present invention provides a unique fuel container support system, that is economical in manufacture, assembly and usage, which is compact for transport and storage with surrounding combustion engine support structure, which can be readily moved to a preselected, safe supportive position by a simple manual manipulation when a fuel container is required to support combustion engine operations and can be returned by an equally simple manual manipulation to the initial compact transport and storage position when combustion engine operations cease.

Various other features of the present invention will become obvious to one skilled in the art upon reading the disclosure set forth herein.

BRIEF SUMMARY OF THE INVENTION

More particularly the present invention provides an improved fuel container support system for a combustion engine comprising: a combustion engine; frame means adjacent the combustion engine; a shelf member supportively mounted on the frame means in a first position adjacent the engine; and, means to permit movement of the shelf member relative the frame means to a second position removed from the combustion engine to support a fuel container thereon to supply fuel to the combustion engine. In addition, the present invention provides a unique pumping arrangement for moving fuel from the container to the combustion engine.

It is to be understood that various changes can be made in one or more of the several parts of the novel apparatus disclosed herein without departing from the scope or spirit of the invention.

BRIEF DESCRIPTION OF THE DRAWING

Referring to the drawing which discloses one advantageous embodiment of the present invention.

DETAILED DESCRIPTION OF THE DRAWING

Figure 1:
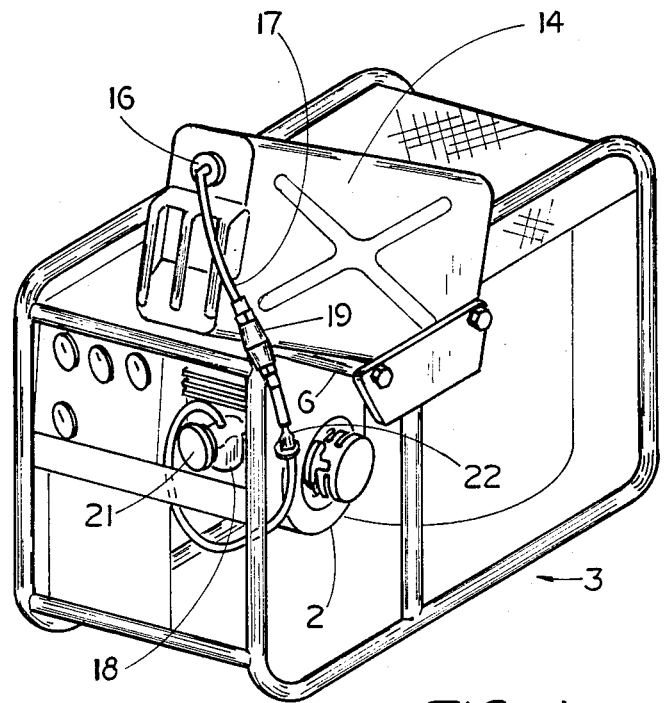
FIG. 1 is a perspective view of the novel fuel container support system including the fuel container in association with a combustion engine and surrounding combustion engine support structure, some of the units driven by the combustion engine being shown in block form; and, FIG. 2 is a partial, broken away perspective view of the novel shelf member in cantilevered position to receive a fuel container.

As disclosed in FIG. 1 of the drawing, combustion engine 2 is shown mounted in a comparatively light weight, generally rectangular tubular skid frame structure 3. This skid frame structure also can serve to house other units such as a heater, an air conditioner, a stove or a pump, schematic block form being used in the drawing for these units. The combustion engine 3 as disclosed is a typical gasoline fueled engine but it is to be understood that other types of engines requiring other liquid fuels can be utilized with the present invention.

Figure 2:
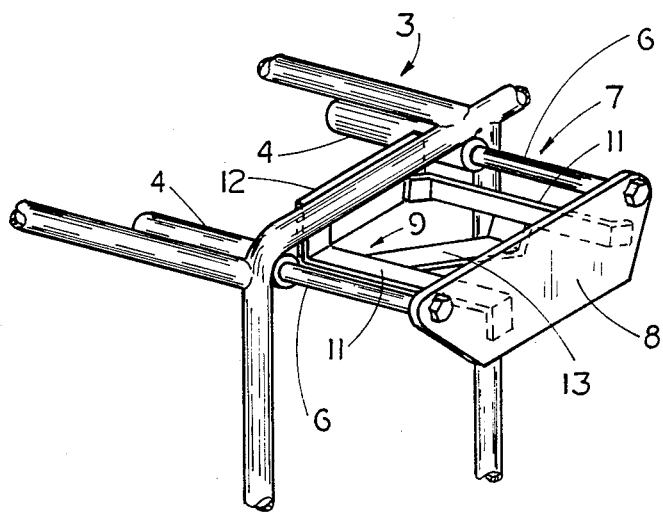

Referring to FIG. 2, mounted on spaced opposed tubular members of frame 3 is a pair of spaced open-ended tubular rail members 4 which serve to receive a pair of appropriately spaced slide bars 6 mounted on the moveable shelf member generally designated by reference numeral 7. Shelf 7 includes a vertical end plate 8 to which the corresponding spaced ends of slide bars 6 are normally mounted. The other or opposite ends of slide bars 6 telescopically engage in tubular rail members 4 fixed to frame 3 for sliding telescopic movement therein to move shelf member 7 from a first position above engine 2 to a cantilevered safer position away from the main body of frame 3 and engine 2 housed therein.

End plate 8 has a container support bracket broadly designated by reference numeral 9 mounted thereto between slide bars 8. Support bracket 9 includes a pair of spaced Z-straps 11, one of the corresponding ends of which is mounted to end plate 8 and the opposite corresponding ends having the ends of a stop bar 12 fixed thereto to extend therebetween. Bar 12 is positioned to abut against frame 3 when shelf member 7 is cantilevered to open position, thus limiting the shelf from further extension and disconnection in the event of conditions such as engine vibration.

As can be seen in FIG. 2, the spaced cantilevered Z-straps are provided with a right angle cradle strap 13 mounted at its opposite ends to points intermediate Z-straps 11 to extend therebetween. Right angle cradle strap 13 serves to receive a nesting bottom corner of a generally rectangular portable fuel container 14, the bottom corner of container 14 nesting at the apex of the right angle of cradle strap 13 with the longitudinal side of container 14 resting on the length of strap 13. With this arrangement, fuel concentrates at the lowest corner of container 14 by gravity, assuring maximum fuel usage efficiency. It is to be understood that other shapes of containers could be utilized if desired, such containers being advantageously designed to nest at a corner with the shelf cradle and rest at an angle to the horizontal so that fuel concentrates by gravity during usage at the lowest container corner. Since most commercial and military portable containers are of the typical five gallon "GI" type, such a container is disclosed herein.

In a typical operation, lower corner of rectangular portable container 14 is nested at the apex of cradle strap 13 and the inlet cap (not shown) of container 14 is removed from the upper corner portion thereof and replaced by vented cap 16. A fuel line 17 is provided having one end extending through vented cap 16 into portable fuel container 14. As can be seen in FIG. 1, the other end of fuel line 17 connects to a small pump 18 (shown in block form) which in turn feeds to the carburetor of combustion engine 2. Advantageously, pump 18 can be a diaphragm type pump operative on the engine compression vacuum cycle of combustion engine 2. A suitable manually compressible pump 19 can be included in fuel line 17 to initiate fuel flow through line 17 to engine 2. It is to be understood that a suitable air filter 21 can be provided for the intake of engine 2 and a suitable liquid filter 22 can be provided in fuel line 17.

Once the combustion engine 2 has been started, engine driven diaphragm pump 18 takes over to assure a steady flow of fuel from shelf supported portable container 14 to the engine. When operations cease, portable container 14 is removed from shelf 7, shelf 7 is pushed manually inward until end plate 8 abuts frame 3 and the entire frame 3 and container 14 can be transported separately to another site.

Thus, a unique, compact, light but sturdy and efficient fuel support system for a portable combustion engine is provided, requiring a minimum of manufacturing and assembly steps and substantially reducing the recognized hazards of past fuel supply systems.

The invention claimed is:

1. An improved fuel container support system for a combustion engine comprising:
   a combustion engine;
   frame means adjacent said combustion engine;
   a shelf member supportively mounted on said frame means in a first position adjacent said combustion engine; and,
   means to permit movement of said shelf member relative said frame means to a second position removed from said combustion engine to support a fuel container thereon to supply fuel to said combustion engine.

2. The fuel container support system of claim 1, said shelf member being in the form of a cradle slidably mounted on said frame means, said cradle being formed to receive a nesting corner of a generally rectangular fuel container to support said container at an angular position with respect to the horizontal with said nesting corner being the lowest corner of the supported container for gravity flow of container fuel thereto.

3. The fuel support system of claim 1, said shelf member being supportively mounted on said frame means in a first position above said combustion engine and in a second position in supported cantilevered relation on said frame means removed from said combustion engine.

4. The fuel container support system of claim 1, including a fuel line with a manual fuel priming starter and fuel pump disposed therein to conduct fuel from a container supported on said shelf member to said combustion engine, said fuel pump being driven by said combustion engine after fuel priming.

5. The fuel container support system of claim 1, said frame means including rail member means mounted thereon, said shelf member including an end plate having slide bar means extending normally therefrom slidably engageable with said rail member means, and a support bracket including spaced parallel strap members cantilevered normally from said end plate and an angled cradle strap mounted therebetween to receive a nesting corner of a generally rectangular fuel container at the apex of said angle to support said container at an angular position with respect to the horizontal with said nesting corner being the lowest corner of the supported container for gravity flow of container fuel thereto.

6. The fuel container support system of claim 5, and a stop strap mounted between said spaced parallel strap members at the extremities opposite said end plate adapted to abut said frame means and limit outward movement of said shelf member.

7. An improved fuel container support system for a combustion engine comprising:
   a combustion engine;
   a generally rectangular tubular skid frame structure surrounding said engine, said tubular skid frame structure having a pair of spaced open-ended tubular rail members fixed thereto in horizontal position above said combustion engine;
   a shelf member including a vertical end plate having a pair of spaced tubular slide bars normally mounted thereto at one end thereof with the opposite ends of said tubular slide bars telescopically engaging with said pair of open-ended tubular rail members for sliding telescopic movement therein, to move the shelf from a first position above said engine to a cantilevered position away from said engine, said end plates having a support bracket including spaced parallel strap members cantilevered normally therefrom between said pair of tubular slide bars and having a right angle cradle strap mounted therebetween to receive during combustion engine operation a nesting bottom corner of a generally rectangular portable fuel container at the apex of said right angle to support said container at an angular position with respect to the horizontal with said nesting corner being the lowest corner of a container for gravity flow of fuel thereto;
   a fuel line connectible to an upper inlet of the container, said fuel line having a primary manual fuel flow pump to start fluid flow and a diaphragm fuel pump disposed therein to conduct fuel from the container to the combustion engine, said fuel pump being driven on the compression vacuum cycle of said engine.

* * * * *